United States Patent
Humy et al.

(10) Patent No.: US 12,203,519 B1
(45) Date of Patent: Jan. 21, 2025

(54) ROTATIONAL COUPLING DEVICE WITH BEARING SHIELD

(71) Applicant: Warner Electric Technology LLC, Braintree, MA (US)

(72) Inventors: Michael Edwin Humy, Roscoe, IL (US); Clinton Lee Mcclellan, Avilla, IN (US)

(73) Assignee: Warner Electric Technology LLC, Braintree, MA (US)

( * ) Notice: Subject to any disclaimer, the term of this patent is extended or adjusted under 35 U.S.C. 154(b) by 0 days.

(21) Appl. No.: 18/602,524

(22) Filed: Mar. 12, 2024

(51) Int. Cl.
| | |
|---|---|
| F16D 67/06 | (2006.01) |
| F16C 19/18 | (2006.01) |
| F16D 27/112 | (2006.01) |
| F16D 27/14 | (2006.01) |

(52) U.S. Cl.
CPC ............. F16D 67/06 (2013.01); F16C 19/18 (2013.01); F16D 27/112 (2013.01); F16D 27/14 (2013.01); *F16C 2326/01* (2013.01); *F16D 2300/08* (2013.01)

(58) Field of Classification Search
CPC ...... F16D 25/02–25/14; F16D 2300/08; F16C 33/723; F16C 33/76; F16C 33/783; F16C 2361/43
USPC .................................................. 192/84.961
See application file for complete search history.

(56) References Cited

U.S. PATENT DOCUMENTS

| | | |
|---|---|---|
| 3,624,768 A | 11/1971 | Nussli |
| 3,679,034 A | 7/1972 | Miller |
| 3,743,068 A * | 7/1973 | Westervelt ............ F16D 27/112 277/575 |
| 4,126,215 A | 11/1978 | Puro |
| 4,129,026 A | 12/1978 | Pierce et al. |
| 4,210,890 A | 7/1980 | Olsen |

(Continued)

FOREIGN PATENT DOCUMENTS

| | | |
|---|---|---|
| CN | 86203432 U | 9/1987 |
| CN | 102478084 A | 5/2012 |

(Continued)

OTHER PUBLICATIONS

English (machine) translation of CN 12478084 A.

(Continued)

*Primary Examiner* — Richard M Lorence
(74) *Attorney, Agent, or Firm* — Reising Ethington P.C.

(57) ABSTRACT

A rotational coupling includes a hub assembly configured for rotation about a rotational axis. The hub assembly includes a hub disposed about the axis and configured to receive a shaft and a disc extending radially outwardly from the hub. An armature and electromagnet are disposed on opposite axial sides of the disc. The electromagnet is fixed against rotation. A bearing is disposed between the hub and the electromagnet. The hub assembly and electromagnet are separated by an air gap on an outboard side of the bearing. A debris shield is axially aligned with, and extends across the radial length of, the air gap and, in some embodiments, is at least partially disposed within the air gap. The shield has a fixed end coupled to one of the hub assembly and electromagnet during assembly and a free end configured to engage the other through a spring force and/or electromagnetic attraction.

20 Claims, 6 Drawing Sheets

(56) References Cited

U.S. PATENT DOCUMENTS

| | | | |
|---|---|---|---|
| 4,241,818 A * | 12/1980 | Miller | F16D 27/112 |
| | | | 192/109 R |
| 5,396,976 A | 3/1995 | Koitabashi | |
| 7,063,193 B2 | 6/2006 | Yoshida | |
| 7,975,818 B2 | 7/2011 | Pardee | |
| 9,709,111 B1 | 7/2017 | Gill et al. | |
| 10,113,596 B2 | 10/2018 | Nakajima et al. | |
| 10,883,552 B2 | 1/2021 | Holmbeck et al. | |
| 2005/0107200 A1* | 5/2005 | Yamazaki | B60K 23/0808 |
| | | | 903/952 |
| 2006/0186605 A1 | 8/2006 | Yoshida | |
| 2006/0219497 A1 | 10/2006 | Organek et al. | |
| 2008/0312018 A1 | 12/2008 | Nakata et al. | |
| 2009/0229941 A1 | 9/2009 | Pardee | |
| 2013/0015033 A1 | 1/2013 | Pardee et al. | |
| 2015/0129382 A1 | 5/2015 | Isono | |
| 2018/0047489 A1 | 2/2018 | Kato et al. | |
| 2018/0187727 A1 | 7/2018 | Hornbrook et al. | |

FOREIGN PATENT DOCUMENTS

| | | |
|---|---|---|
| CN | 103180629 A | 6/2013 |
| CN | 103307158 A | 9/2013 |
| CN | 203488594 U | 3/2014 |
| CN | 203627590 U | 6/2014 |
| CN | 104638824 A | 5/2015 |
| CN | 105358857 A | 2/2016 |
| CN | 105987095 A | 10/2016 |
| CN | 107956816 A | 4/2018 |
| CN | 109415968 A | 3/2019 |
| CN | 208651480 U | 3/2019 |
| EP | 0351098 A1 | 1/1990 |
| EP | 1056958 B1 | 5/2004 |
| GB | 866588 A | 4/1961 |
| JP | S50-18893 U | 3/1975 |
| JP | S52-22847 U | 2/1977 |
| JP | S54-169645 U | 11/1979 |
| JP | S60-62630 U | 5/1985 |
| JP | S60-205026 A | 10/1985 |
| JP | 2005-098335 A | 4/2005 |
| RU | 2027087 C1 | 1/1995 |
| WO | 2017204865 A1 | 11/2017 |

OTHER PUBLICATIONS

English (machine) translation of CN 103180629 A.
English (machine) translation of CN 103307158 A.
English (machine) translation of CN 104638824 A.
English (machine) translation of CN 105358857 A.
English (machine) translation of CN 105987095 A.
English (machine) translation of CN 107956816 A.
English (machine) translation of CN 109415968 A.
English (machine) translation of CN 86203432 U.
English (machine) translation of CN 203488594 U.
English (machine) translation of CN 203627590 U.
English (machine) translation of CN 208651480 U.
English (machine) translation of JP S50-18893 U.
English (machine) translation of JP S52-22847 U.
English (machine) translation of JP S54-169645 U.
English (machine) translation of JP S60-62630 U.
English (machine) translation of JP S60-205026 A.
English (machine) translation of JP 2005-098335 A.
English (machine) translation of RU 2027087 C1.

* cited by examiner

ROTATIONAL COUPLING DEVICE WITH BEARING SHIELD

BACKGROUND OF THE INVENTION a. Field of the Invention

This disclosure relates to a rotational coupling device. In particular, the disclosure relates to a rotational coupling device having a shield that inhibits fluids and particulates from reaching a bearing in the device while also facilitating assembly of the device and, in certain embodiments, improving flux transfer within the device.

b. Background Art

Rotational coupling devices such as clutches and brakes are used to control transfer of torque between two bodies. In conventional electromagnetic coupling devices, a coupling disc or rotor is coupled to an input or output member and an armature disposed on one side of the disc is coupled to the other of the input and output members. An electromagnet is disposed on the opposite side of the disc relative to the armature and is energized and de-energized to cause the armature to engage with, and disengage from, the disc in order to rotatably couple or decouple the input and output members and/or brake one of the members. The electromagnet is often fixed against rotation. Therefore, conventional coupling devices include a bearing disposed between the electromagnet and rotating parts of the coupling device. Depending on the application in which the device is being used, the bearing may be exposed to contaminants such as fluids and/or dust thereby reducing the life of the device.

In order to inhibit contaminants from reaching the bearing, seals have been developed that can be attached to one of the races of the bearing and extend across the gap between the races. Use of these seals requires maintaining an inventory of the seals, however, and a separate operation to assemble the seal to the bearing. Further, assembly of the seal to the bearing race is difficult and can result in damage or a change in the functionality of the bearing.

In order to overcome the disadvantages associated with conventional seals, Applicant previously developed several debris shields that are set forth in U.S. Pat. No. 10,883,552 B2, the entire disclosure of which is incorporated herein by reference. Although those shields have functioned well for their intended purpose, at least some of the shields still require the end user of the coupling device to assemble the shield to the other components of the coupling device prior to use. As a result, assembly of the shield creates an inconvenience for the end user that may result in failure to use the shield. The end user may also simply forget to install the shield or may install the shield improperly leading to a potential failure of the device.

The inventors herein have recognized a need for a rotational coupling device that will minimize and/or eliminate one or more of the above-identified deficiencies.

BRIEF SUMMARY OF THE INVENTION

This disclosure relates to a rotational coupling device. In particular, the disclosure relates to a rotational coupling device having a shield that inhibits fluids and particulates from reaching a bearing in the device while also facilitating assembly of the device and, in certain embodiments, improving flux transfer within the device.

A rotational coupling device in accordance with one embodiment of the present teachings includes a hub assembly configured for rotation about a rotational axis. The hub assembly includes a rotor hub disposed about the rotational axis and configured to receive a shaft and a rotor disc extending radially outwardly from the rotor hub. The device further includes an armature disposed on a first axial side of the rotor disc and an electromagnet disposed on a second axial side of the rotor disc opposite the armature and fixed against rotation. The device further includes a bearing disposed between the rotor hub and the electromagnet. The hub assembly and the electromagnet are separated by an air gap on an outboard side of the bearing. The device further includes a shield partially disposed within the air gap and extending across the entire radial length of the air gap. The shield has a fixed end engaging one of the hub assembly and the electromagnet and a free end opposite the fixed end, the free end configured for engagement with the other one of the hub assembly and the electromagnet.

A rotational coupling device in accordance with another embodiment of the present teachings includes a hub assembly configured for rotation about a rotational axis. The hub assembly includes a rotor hub disposed about the rotational axis and configured to receive a shaft and a rotor disc extending radially outwardly from the rotor hub. The device further includes an armature disposed on a first axial side of the rotor disc and an electromagnet disposed on a second axial side of the rotor disc opposite the armature and fixed against rotation. The device further includes a bearing disposed between the rotor hub and the electromagnet. The hub assembly and the electromagnet are separated by an air gap on an outboard side of the bearing. The device further includes a shield extending across the entire radial length of the air gap. The shield has a fixed end affixed to the electromagnet and a free end opposite the fixed end, the free end configured for engagement with the hub assembly.

A rotational coupling device in accordance with another embodiment of the present teachings includes a hub assembly configured for rotation about a rotational axis. The hub assembly includes a rotor hub disposed about the rotational axis and configured to receive a shaft and a rotor disc extending radially outwardly from the rotor hub. The device further includes an armature disposed on a first axial side of the rotor disc and an electromagnet disposed on a second axial side of the rotor disc opposite the armature and fixed against rotation. The device further includes a bearing disposed between the rotor hub and the electromagnet. The hub assembly and the electromagnet are separated by an air gap on an outboard side of the bearing. One of a component of the hub assembly and the electromagnet defines a radially extending shield axially aligned with, and extending across the entire radial length of, the air gap. The shield forms a unitary body with the one of the component of the hub assembly and the electromagnet.

A rotational coupling device in accordance with the present teachings is advantageous relative to conventional coupling devices. The coupling device includes a shield that inhibits contaminants such as fluids and particulates from reaching a bearing of the device. A fixed end of the shield is coupled to the hub assembly or electromagnet and may therefore be included with the device as a pre-assembled unit thereby eliminating an inconvenience for the end user of the device and eliminating the possibility that the end user will forget to install or improperly install the shield. Further, because the shield is not directly attached to the bearing race, potential damage and/or misalignment of the bearing during assembly is reduced. In certain embodiments, the shield is also configured to provide an additional flux transfer path for the electromagnetic circuit in the coupling device to improve flux transfer within the device. In certain embodiments, the shield may also deform in the presence of magnetic flux and/or as the result of a spring force to reduce the size of an opening leading to the bearing and improve sealing of the bearing.

The foregoing and other aspects, features, details, utilities, and advantages of the invention will be apparent from reading the following detailed description and claims, and from reviewing the accompanying drawings illustrating features of this invention by way of example.

DETAILED DESCRIPTION OF THE INVENTION

Figure 1:
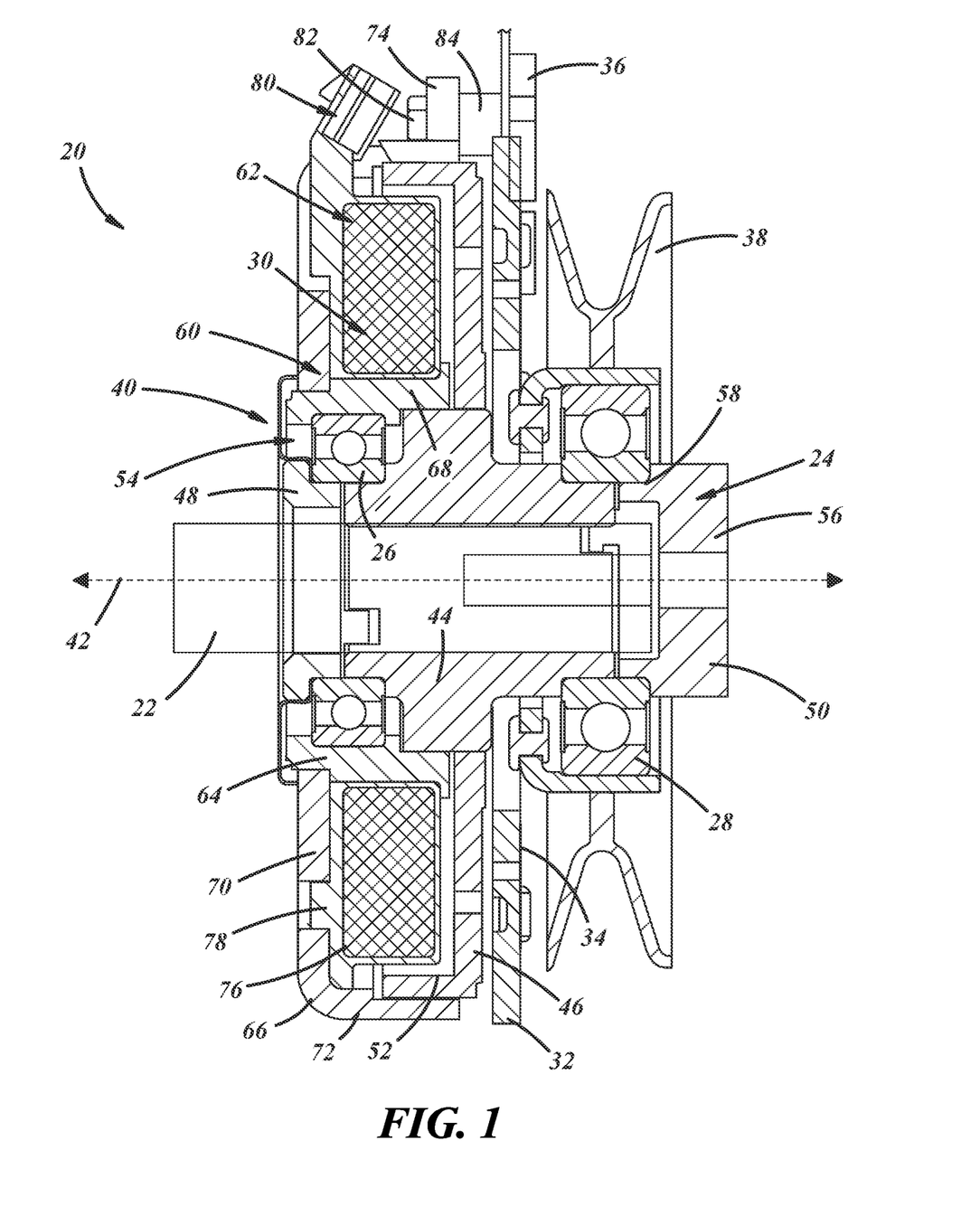
FIG. 1 is a cross-sectional view of one embodiment of a rotational coupling device.

Referring now to the drawings wherein like reference numerals are used to identify identical components in the various views, FIG. 1 illustrates a rotational coupling device 20 in accordance with one embodiment of the present invention. Device 20 functions as a clutch to selectively transfer torque between a shaft 22 and another device (not shown). Device 20 also functions as a brake when torque is not being transferred. Device 20 may be provided for use in a riding lawnmower or similar device. It will be understood by those of ordinary skill in the art, however, that device 20 may be used in a wide variety of applications requiring a clutch and/or brake. Device 20 may include a hub assembly 24, bearings 26, 28, an electromagnet 30, an armature 32, springs 34, a brake plate 36 and a torque transmission member 38. In accordance with the present teachings, coupling 20 further includes a bearing shield 40.

Shaft 22 may function as an input shaft-delivering torque from a device (not shown) from which shaft 22 extends through coupling device 20 to another device (not shown). Alternatively, shaft 22 may function as an output shaft-receiving torque through coupling device 20 from another device (not shown) and transferring that torque to a device (not shown) from which shaft 22 extends. Shaft 22 may be made from conventional metals and metal alloys and may be solid or tubular. Shaft 22 is centered about a rotational axis 42 and may be driven by an engine, electric motor or other conventional power source when functioning as an input shaft. In the illustrated embodiment shaft 22 is inserted into device 20 on the opposite side of device 20 as torque transmission member 38 ("standard mount").

Hub assembly 24 is provided to position and orient the other components of device 20 and provides a means for transferring torque between shaft 22 and member 38 through selective engagement with armature 32. Assembly 24 may include a rotor hub 44, a rotor disc 46, and spacers 48, 50.

Rotor hub 44 is coupled to shaft 22 for rotation therewith. Rotor hub 44 may be made from conventional metals and metal alloys. Rotor hub 44 is tubular and defines a central bore into which shaft 22 extends and is disposed about, and may be centered about, axis 42. Rotor hub 44 may define an axially extending keyway (not shown) shaped complementary to, and configured to receive, a key (not shown) in shaft 22. Alternatively, rotor hub 44 may be shaped with an integral, radially extending key configured to be received within a keyway in shaft 22. At either axial end, rotor hub 44 defines shoulders that abut against the inner races of bearings 26, 28 on one axial side of each bearing 26, 28 to support bearings 26, 28. Further, rotor hub 44 may define one or more notches or lugs disposed in either axial end face of rotor hub 44 configured to engage corresponding notches or lugs in spacers 48, 50 as described in greater detail in U.S. Pat. No. 7,527,134, the entire disclosure of which is incorporated herein by reference.

Rotor disc 46 extends radially outwardly from rotor hub 44 and defines a clutch engagement surface facing armature 32. Rotor disc 46 is coupled to rotor hub 44 through, for example, a press-fit relationship including a plurality of complementary lugs and notches. As is known in the art, rotor disc 46 may include a plurality of radially spaced rows of angularly spaced, arcuate slots (not shown). Upon energization of electromagnet 30, the slots cause magnetic flux to travel back and forth between rotor disc 46 and armature 32 across an air gap enabling a high torque engagement between rotor disc 46 and armature 32. At its outer diameter, rotor disc 46 defines an axially extending outer pole 52 for a purposed described hereinbelow.

Spacer 48 is provided to support bearing 26 and electromagnet 30 in assembled relation with the other components of device 20 and may be made from conventional materials including powdered metals. Spacer 48 is disposed about, and may be centered about, axis 42 and is generally cylindrical in shape. An inner diameter of spacer 48 is sized to receive shaft 22. An outer diameter of spacer 48 varies to define a shoulder configured to face the inner race of bearing 26 on an opposite side of bearing 26 relative to rotor hub 44 such that bearing 26 is disposed between opposed shoulders defined in spacer 48 and rotor hub 44. Spacer 48 is disposed radially inwardly of electromagnet 30 and the radially outermost surface of spacer 48 is radially separated from electromagnet 30 by an air gap 54 that is axially aligned with bearing 26 on an outboard side of bearing 26. Spacer 48 may further define one or more axially projecting lugs or notches in an axial end face of spacer 48 configured to be received within or receive, respectively, corresponding notches or lugs in an axial end face of rotor hub 44 to rotatably couple spacer 48 and rotor hub 44.

Spacer 50 is provided to support bearing 28 and torque transmission member 38 in assembled relation with the other components of device 20 and may be made from conventional materials including powdered metals. Spacer 50 may have a lower magnetic permeability than rotor hub 44, rotor disc 46, electromagnet 30 and armature 32 and may be made from, for example, non-ferromagnetic materials. Spacer 50 is disposed about, and may be centered about, axis 42 and is generally cylindrical in shape. Spacer 50 is configured to receive a fastener (not shown) that extends through spacer 50 and into shaft 22. Like spacer 50, the fastener may have a lower magnetic permeability than rotor hub 44, rotor disc 46, electromagnet 30 and armature 32 and may be made from, for example, non-ferromagnetic materials such as certain stainless steels. Spacer 50 may define a head 56 at one axial end having a plurality of flats that allow spacer 50 to be secured while applying torque to the fastener. Spacer 50 may further define a body 58 extending axially from head 56. Body 58 has a generally cylindrical outer surface on which bearing 28 may be supported between opposed shoulders defined in rotor hub 44 and spacer 50. Spacer 50 may further define one or more axially projecting lugs or notches in an axial end face of body 58 configured to be received within or receive, respectively, corresponding notches or lugs in an axial end face in rotor hub 44 to rotatably couple spacer 50 and rotor hub 44.

Bearing 26 is provided to allow rotation of rotor hub 44 and spacer 48 relative to electromagnet 30. Bearing 26 is conventional in the art. An inner race of bearing 26 is supported on rotor hub 44 and spacer 48 and may abut opposed shoulders defined in rotor hub 44 and spacer 48. An outer race of bearing 26 supports electromagnet 30.

Bearing 28 is provided to allow rotation of torque transmission member 38 relative to input shaft 22, rotor hub 44 and spacer 50. Bearing 28 is conventional in the art. An inner race of bearing 28 is supported on rotor hub 44 and spacer 50 and abuts opposed shoulders defined in rotor hub 44 and spacer 50. An outer race of bearing 28 supports torque transmission member 38.

Electromagnet 30 creates an electromagnetic circuit among electromagnet 30, armature 32, rotor hub 44, and rotor disc 46 to cause movement of armature 32 into engagement with rotor disc 46 and transmission of torque between shaft 22 and torque transmission member 38. Electromagnet 30 is disposed on one side of rotor disc 46 opposite armature 32 and includes a field shell or housing 60 and a conduction assembly 62.

Housing 60 is provided to house conduction assembly 62. Housing 60 also forms part of an electromagnetic circuit that causes the selective engagement of armature 32 and rotor disc 46. Housing 60 may be made from conventional metals and metal alloys, including steel. Housing 60 is cylindrical and is disposed about, and may be centered about, axis 42 and is supported on an outer race of bearing 26. Housing 60 is fixed against rotation. Housing 60 is generally U-shaped in cross-section and includes radially inner and radially outer annular members 64, 66.

Inner member 64 is supported on an outer race of bearing 26. An inboard axial end of inner member 64 is disposed radially outward of, and spaced from, rotor hub 44 and is axially aligned with, and spaced from, rotor disc 46. Member 64 defines an axially extending inner pole 68 spaced from, and radially inward of, outer pole 52 on rotor disc 46.

Outer member 66 is coupled to and supported on inner member 64. Outer member 66 defines an end wall 70, an axially extending outer pole 72, and a flange 74. End wall 70 extends radially outwardly from member 64. Pole 72 is integral with, and extends axially from, end wall 70. Pole 72 is disposed radially outwardly of, and spaced from, pole 52 of rotor disc 46. Flange 74 is integral with, and extends radially outwardly from, pole 72 at an end of pole 72 opposite end wall 70. Flange 74 extends along at least a portion of the circumference of pole 72.

Conduction assembly 62 is provided to create a magnetic circuit among housing 60 of electromagnet 30, armature 32, rotor hub 44, and rotor disc 46 to cause movement of armature 32 into engagement with rotor disc 46 and transmission of torque between shaft 22 and torque transmission member 38. Conduction assembly 62 is generally annular and is disposed about, and may be centered about, axis 42 within housing 60. In particular, assembly 62 is disposed between the inner and outer poles 68, 72 of housing 60. Assembly 62 includes a conductor 76 and a conductor shell 78.

Conductor 76 may comprise a conventional copper coil although other known conductors may alternatively be used. Conductor 76 may be connected electrically to a power supply (not shown) such as a battery. Upon energization of conductor 76, an electromagnetic circuit is formed between housing 60 of electromagnet 30, armature 32, rotor hub 44, and rotor disc 46. Magnetic flux flows from outer pole 72 of outer member 66 of housing 60 across an air gap to outer pole 52 of rotor disc 46. Flux then travels back and forth between rotor disc 46 and armature 32 across the air gap between them. Flux then flows from rotor disc 46 to inner member 64 of housing 60 and to rotor hub 44. Flux may flow from rotor hub 44 to inner member 64 of housing along several paths. A portion of the flux flows directly from rotor hub 44 to inner member 64 of housing 60 across an air gap. In accordance with one aspect of teachings disclosed herein, another portion of the flux may flow indirectly from rotor hub 44 to inner member 64 of housing 60 radially inward of bearing 26 and through spacer 48 and shield 40 as discussed in more detail hereinbelow.

Conductor shell 78 is provided to house conductor 76 and is also used to mount conductor 76 within housing 60 of electromagnet 30. Conductor shell 78 may be molded from conventional plastics. Conductor shell 78 may include an integral terminal connector 80 through which conductor 76 may be electrically connected to a power source. Conductor shell 78 may also define one or more lugs sized to be received within recesses in end wall 70 of member 66 of housing 60 to prevent rotation of conduction assembly 62. Conductor shell 78 may include a radially outwardly extending flange disposed proximate outer pole 72 of housing 60 and affixed to member 66 of housing 60 at a plurality of points as described in commonly assigned pending U.S. Pat. No. 7,975,818, the entire disclosure of which is incorporated herein by reference.

Armature 32 is provided to transmit torque between rotor disc 46 and torque transmission member 38. Armature 32 may be made from a variety of conventional metals and metal alloys including steel. Armature 32 is annular in construction and disposed about, and may be centered about, axis 42. Armature 32 is disposed on one side of rotor disc 46 opposite electromagnet 30 and defines a clutch engagement surface facing rotor disc 46. Armature 32 is axially spaced from rotor disc 46 by an air gap. Like rotor disc 46, armature 32 may include a plurality of radially spaced rows of angularly spaced arcuate slots (not shown) that facilitate travel of magnetic flux back and forth between rotor disc 46 and armature 32 upon energization of conduction assembly 62. Armature 32 is coupled to transmission member 38. In particular, armature 32 may be coupled to torque transmission member 38 by a plurality of leaf springs 34.

Springs 34 transmit drive and braking torque between armature 32 and torque transmission member 38 and allow for axial movement of armature 32 relative to member 38 and towards and away from rotor disc 46. Springs 34 may be made from stainless steel and are connected at one end to armature 32 and at an opposite end to member 38 using conventional fasteners such as rivets, screws, bolts, or pins.

Brake plate 36 provides a braking surface for engagement by armature 32 to brake torque transmission member 38. Brake plate 32 may be made from conventional materials having a relatively high magnetic permeability including conventional metals and metal alloys such as steel. Brake plate 36 extends about at least a portion of the circumference of device 20, and preferably only a portion of the circumference of device 20, and is coupled to housing 60 of electromagnet 30. In particular, brake plate 36 is coupled to flange 74 of member 66 of housing 60 and suspended therefrom using one or more fasteners 82. Fasteners 82 may be made from a material or materials (including non-magnetic materials) having a magnetic permeability lower than that of armature 32, rotor hub, rotor disc 46 and housing 60 of electromagnet 30 to reduce or eliminate flux transfer between brake plate 36 and housing 60 and thereby facilitate clutch engagement when conduction assembly 62 is energized. Brake plate 36 may be axially spaced from flange 74 of housing 60 using one or more spacers 84 or shims such as the spacers and shims described in commonly assigned U.S. Pat. No. 8,123,012, the entire disclosure of which is incorporated herein by reference. Spacers 84 allow for adjustment of the position of brake plate 36 to compensate for wear on the clutch engagement surfaces of armature 32 and rotor disc 46, respectively and on the brake engagement surfaces of armature 32 and brake plate 36. Spacers 84 may include bores through which fasteners 82 extend. Spacers 84 may likewise be made from a material or materials (including non-magnetic materials) having a relatively lower magnetic permeability than that of armature 32, rotor hub 44, rotor disc 46 and housing 60 of electromagnet 30 to reduce or eliminate flux transfer between brake plate 36 and housing 60. Referring, for example, to commonly assigned U.S. Pat. No. 7,732,959, the entire disclosure of which is incorporated herein by reference, plate 36 may house one or more magnets (not shown) and thereby form part of a magnetic circuit with armature 32 and the magnets to assist springs 34 in drawing armature 32 into engagement with brake plate 36 to provide a braking torque to torque transmission member 38.

Torque transmission member 38 transfers torque between shaft 22 and another device such as a lawnmower blade. Member 38 is coupled to armature 32 through leaf springs 34 and is supported for rotation on the outer race of bearing 28. Member 38 is disposed about, and may be centered about, axis 42. In the illustrated embodiment, member 38 comprises a pulley about which a belt may be wound for coupling device 38 to a driving or driven device. It should be understood, however, that member 38 may assume a variety of different forms.

Shield 40 is provided to inhibit contaminants such as fluids or dust from damaging bearing 26. In particular, shield 40 inhibits the passage of contaminants from the external environment through air gap 54 to bearing 26. Shield 40 may be made from a variety of materials. In certain embodiments, shield 40 is made from materials having a relatively high magnetic permeability such as ferromagnetic materials such that shield 40 transfers flux from spacer 48 to one of members 64, 66 of housing 60 of electromagnet 30. Shield 40 is annular in shape and is disposed about, and may be centered about, axis 42.

Figure 2:
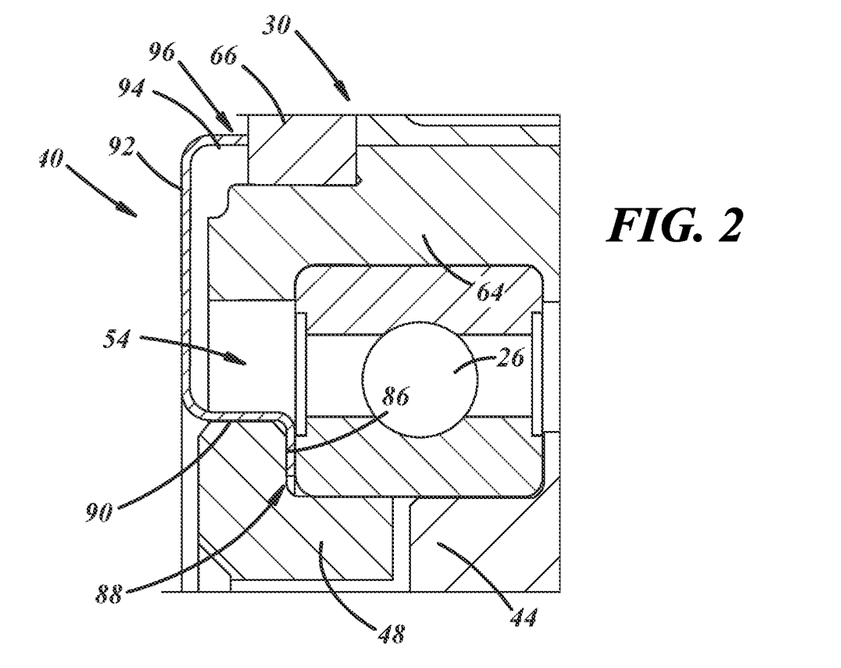
FIG. 2 is an enlarged view of a portion of the rotational coupling device in FIG. 1.
Figure 3:
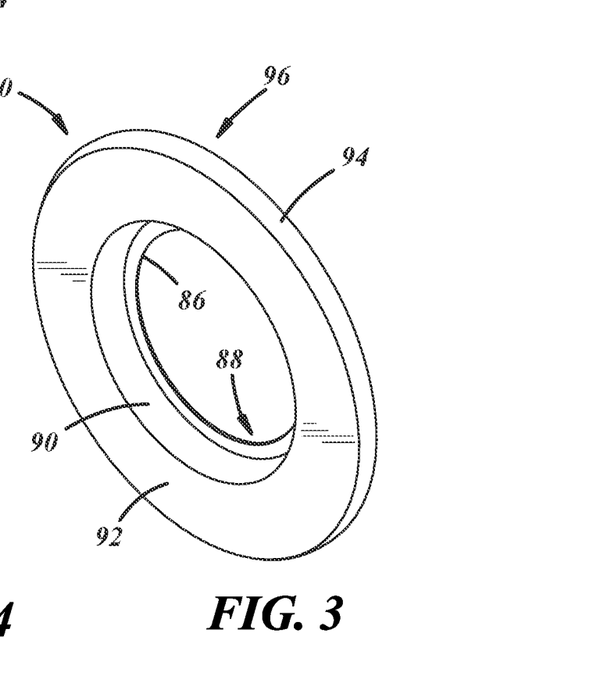
FIGS. 3-4 are perspective view of a bearing shield of the rotational coupling device shown in FIGS. 1-2.
Figure 4:
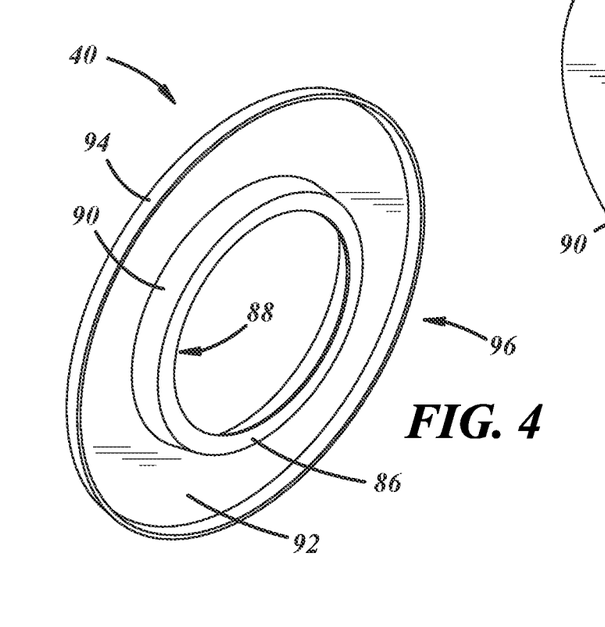

Referring to FIGS. 2-4, shield 40 includes an a radially innermost portion 86 that extends in a generally radial direction and defines a fixed end 88 of shield 40. Portion 86 and fixed end 88 are disposed axially between bearing 26 and spacer 48 and, in particular, between opposed radially extending surfaces of the inner race of bearing 26 and spacer 48. During assembly of device 20 and prior to providing device 20 to an end user, shield 40 is positioned to align portion 86 of shield 40 with the inner race of bearing 26 and spacer 48 is then moved along axis 42 and coupled to rotor hub 44 thereby securing portion 86 of shield 40 between the inner race of bearing 26 and spacer 48. In this manner, movement of fixed end 88 of shield 40 is inhibited. Shield 40 further includes a portion 90 that extends in a generally axial direction and has an inboard axial end extending from a radially outer end of portion 86. Portion 90 is disposed within and extends through the entire axial width of air gap 54. Shield 40 further includes a portion 92 that extends in a generally radial direction and has a radially inner end extending from an axially outboard end of portion 90 opposite the axially inboard end or portion 90 joined to portion 86. Portion 92 is therefore axially spaced from portion 86. Portion 92 is axially aligned with and extends across the entire radial length of air gap 54. Shield 40 further includes a radially outermost portion 94 that extends in a generally axial direction and has an axially outboard end extending from a radially outer end of portion 92 opposite the radially inner end of portion 92 joined to portion 90. Portion 94 is therefore radially spaced from portion 90. Portion 94 defines a free end 96 of shield 40 that is configured for engagement with electromagnet 30. In the illustrated embodiment, free end 96 is configured for engagement with member 66 of housing 60 of electromagnet 30. It should be understood, however, that free end 96 could be configured to engage electromagnet 30 at a variety of different locations. As noted above, in some embodiments shield 40 may be made from materials, such as ferromagnetic materials, that allow magnetic flux to travel from rotor hub 44 to electromagnet 30 (through spacer 48 and shield 40) when electromagnet 30 is energized. The flow of magnetic flux may further result in deformation of shield 40 and improved sealing for bearing 26. In particular, shield 40 has a normal or unstressed state when electromagnet 30 is not energized. In this state, portion 94 and free end 96 of shield 40 may be axially spaced from electromagnet 30 (particularly as the surfaces of shield 40 and electromagnet 30 become worn from use). When electromagnet 30 is energized, shield 40 assumes a deformed or stressed state. In this state, the magnetic flux traveling through shield 40 to housing 60 of electromagnet 30 creates a magnetic attraction between shield 40 and housing 60 urging portion 94 and free end 96 of shield 40 towards housing 60 of electromagnet 30 and, preferably, into contact with housing 60 of electromagnet 30 thereby reducing or eliminating any gap between shield 40 and housing 60 of electromagnet 30 and further reducing the likelihood that contaminants will reach air gap 54 and bearing 26.

Figure 5:
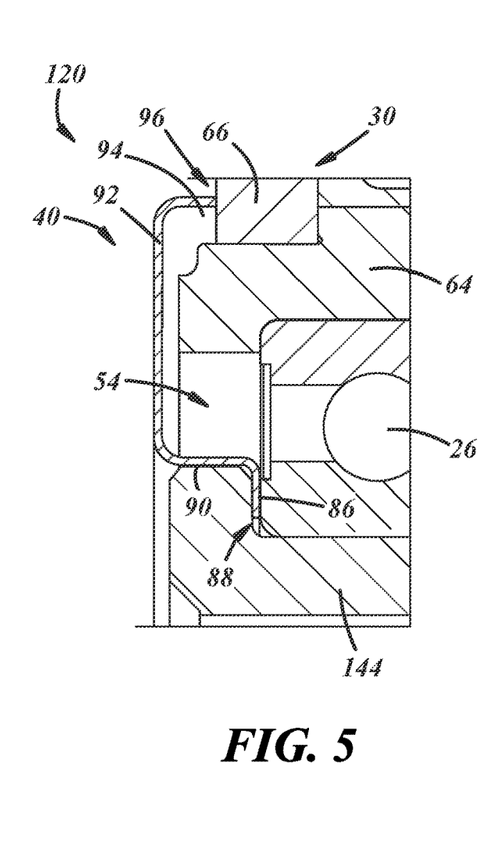
FIGS. 5-11 are partial cross-sectional views of alternate embodiments of a rotational coupling device.

Referring now to FIG. 5, an alternative embodiment of a rotational coupling device 120 is illustrated. Device 120 is substantially similar to device 20 discussed hereinabove. Device 120 differs from device 20 in that device 120 omits the spacer 48 found in the hub assembly 24 of device 20 and instead integrates the rotor hub 44 and spacer 48 of device 20 into a unitary (one-piece) rotor hub 144. As a result, portion 86 and fixed end 88 of shield 40 are disposed axially between bearing 26 and rotor hub 144 and, in particular, between opposed radially extending surfaces of the inner race of bearing 26 and rotor hub 144.

Figure 6:
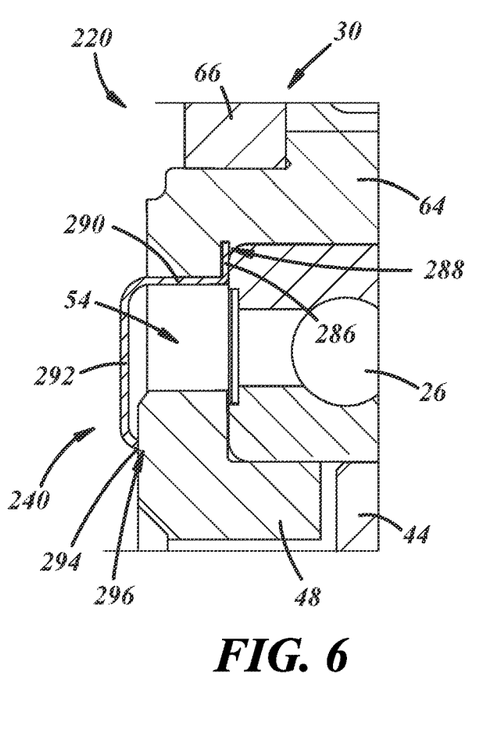

Referring now to FIG. 6, another alternative embodiment of a rotational coupling device 220 is illustrated. Device 220 is substantially similar to device 20 discussed hereinabove. Device 220 differs from device 20 in that device 220 includes a shield 240 whose orientation differs from the orientation of shield 40 in device 20. Shield 240 is again provided to inhibit contaminants such as fluids or dust from damaging bearing 26. In particular, shield 240 inhibits the passage of contaminants from the external environment through air gap 54 to bearing 26. Shield 240 may be made from a variety of materials. In certain embodiments, shield 240 is made from materials having a relatively high magnetic permeability such as ferromagnetic materials such that shield 240 transfers flux from spacer 48 to one of members 64, 66 of housing 60 of electromagnet 30. Shield 240 is annular in shape and is disposed about, and may be centered about, axis 42.

Shield 240 includes an a radially outermost portion 286 that extends in a generally radial direction and defines a fixed end 288 of the shield 240. Portion 286 and fixed end 288 are disposed axially between bearing 26 and electromagnet 30 and, in particular, between opposed radially extending surfaces of the outer race of bearing 26 and electromagnet 30. During assembly of device 220 and prior to providing device 220 to an end user, shield 240 is positioned to align portion 286 of shield 240 with the outer race of bearing 26 and electromagnet 30 is then moved along axis 42 and positioned relative to rotor hub 44 thereby securing portion 286 of shield 240 between the outer race of bearing 26 and electromagnet 30. In this manner, movement of fixed end 288 of shield 240 is inhibited. Shield 240 further includes a portion 290 that extends in a generally axial direction and has an inboard axial end extending from a radially inner end of portion 286. Portion 290 is disposed within and extends through the entire axial width of air gap 54. Shield 240 further includes a portion 292 that extends in a generally radial direction and has a radially outer end extending from an axially outboard end of portion 290 opposite the axially inboard end of portion 290 joined to portion 286. Portion 292 is therefore axially spaced from portion 286. Portion 292 is axially aligned with and extends across the entire radial length of air gap 54. Shield 240 further includes a radially innermost portion 294 that extends in a generally axial direction and has an axially outboard end extending from a radially inner end of portion 292 opposite the radially outer end of portion 292 joined to portion 290. Portion 294 is therefore radially spaced from portion 290. Portion 294 defines a free end 296 of shield 240 that is configured for engagement with spacer 48. As noted above, in some embodiments shield 240 may be made from materials, such as ferromagnetic materials, that allow magnetic flux to travel from rotor hub 44 to electromagnet 30 (through spacer 48 and shield 240) when electromagnet 30 is energized. The flow of magnetic flux may further result in deformation of shield 240 and improved sealing for bearing 26. In particular, shield 240 has a normal or unstressed state when electromagnet 30 is not energized. In this state, portion 294 and free end 296 of shield 240 may be axially spaced from spacer 48 (particularly as the surfaces of shield 240 and spacer 48 become worn after use). When electromagnet 30 is energized, shield 240 assumes a deformed or stressed state. In this state, the magnetic flux traveling between shield 240 and spacer 48 creates a magnetic attraction between shield 240 and spacer 48 urging portion 294 and free end 296 of shield 240 towards spacer 48 and, preferably, into contact with spacer 48 thereby reducing or eliminating any gap between shield 240 and spacer 48 further reducing the likelihood that contaminants will reach air gap 54 and bearing 26.

Figure 7:
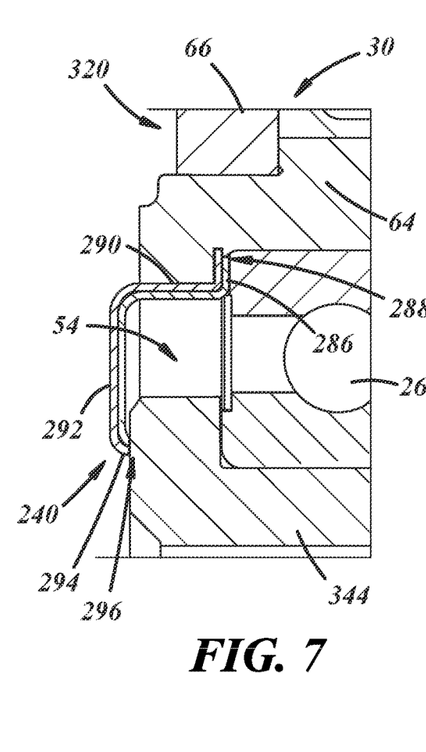

Referring now to FIG. 7, another alternative embodiment of a rotational coupling device 320 is illustrated. Device 320 is substantially similar to device 220 discussed hereinabove. Device 320 differs from device 220 in that device 20 omits the spacer 48 found in the hub assembly 24 of device 220 and instead integrates the rotor hub 44 and spacer 48 of device 220 into a unitary (one-piece) rotor hub 344. As a result, portion 294 and free end 296 of shield 320 are configured to engage a surface of rotor hub 344.

Figure 8:
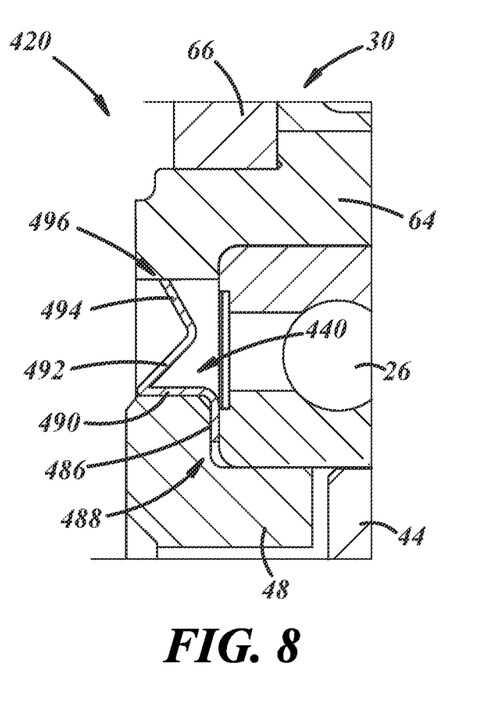

Referring now to FIG. 8, another alternative embodiment of a rotational coupling device 420 is illustrated. Device 420 is substantially similar to device 20 discussed hereinabove. Device 420 differs from device 20 in that device 420 includes a different embodiment of a bearing shield 440. Shield 440 is again provided to inhibit contaminants such as fluids or dust from damaging bearing 26. In particular, shield 440 inhibits the passage of contaminants from the external environment through air gap 54 to bearing 26. Shield 440 may be made from a variety of materials. In certain embodiments, shield 440 is made from materials having a relatively high magnetic permeability such as ferromagnetic materials such that shield 440 transfers flux from spacer 48 to member 64 of housing 60 of electromagnet 30. Shield 440 is annular in shape and is disposed about, and may be centered about, axis 42.

Shield 440 includes an a radially innermost portion 486 that extends in a generally radial direction and defines a fixed end 488 of the shield 440. Portion 486 and fixed end 488 are disposed axially between bearing 26 and spacer 48 and, in particular, between opposed radially extending surfaces of the inner race of bearing 26 and spacer 48. During assembly of device 420 and prior to providing device 420 to an end user, shield 440 is positioned to align portion 486 of shield 440 with the inner race of bearing 26 and spacer 48 is then moved along axis 42 and coupled to rotor hub 44 thereby securing portion 486 of shield 440 between the inner race of bearing 26 and spacer 48. In this manner, movement of fixed end 488 of shield 440 is inhibited. Shield 440 further includes a portion 490 that extends in a generally axial direction and has an inboard axial end extending from a radially outer end of portion 486. Portion 490 is disposed within and extends through at least a portion of the axial width of air gap 54 and may extend through the entire axial width of air gap 54. Shield 440 further includes a portion 492 that extends from portion 490 in a radially outward direction and an axially inboard direction. A radially inner end of portion 492 extends from an axially outboard end of portion 490 opposite the axially inboard end of portion 490 joined to portion 486. The radially inner end of portion 492 intersects the axially outboard end of portion 490 at an acute angle. Shield 440 further includes a radially outermost portion 494 that extends from portion 492 in a radially outward direction and in an axially outboard direction. A radially inner end of portion 494 extends from a radially outer end of portion 492 opposite the radially inner end of portion 492 joined to portion 490. The radially inner end of portion 494 intersects the radially outer end of portion 492 at an acute angle. Portions 492,494 are at least partially disposed within air gap 54 and portions 492, 494 together extend across the entire radial length of air gap 54. Portion 494 defines a free end 496 of shield 440 that is configured for engagement with electromagnet 30. In particular, a radially outer end of portion 494 is configured for engagement with a radially inner surface of member 64 of housing 60 of electromagnet 30. Because of the configuration of shield 440, shield 440 is configured to deform from a normal or unstressed state prior to assembly to a deformed or stressed state after assembly in which the free end 496 applies a spring force against the surface of electromagnet 30. In some embodiments shield 440 may again be made from materials, such as ferromagnetic materials, that allow magnetic flux to travel from rotor hub 44 to electromagnet 30 (through spacer 48 and shield 440) when electromagnet 30 is energized. The flow of magnetic flux may further result in improved sealing for bearing 26. In particular, when electromagnet 30 is energized, the magnetic flux traveling through shield 440 to housing 60 of electromagnet 30 creates a magnetic attraction between shield 440 and electromagnet 30 supplementing the spring force and creating a stronger engagement between portion 494 and free end 496 with electromagnet 30 further reducing the likelihood that contaminants will reach air gap 54 and bearing 26.

Figure 9:
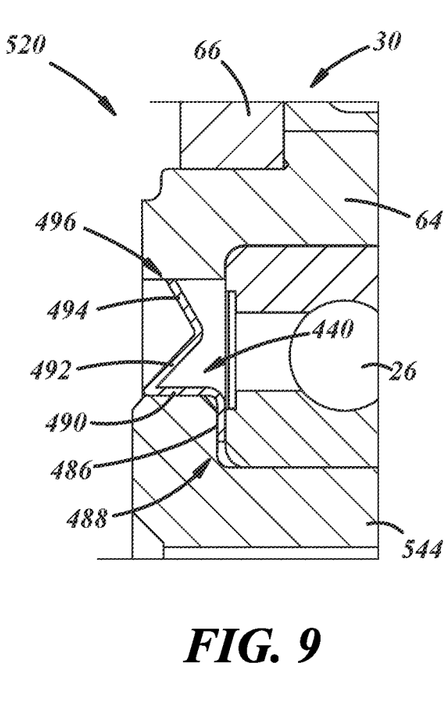

Referring now to FIG. 9, another alternative embodiment of a rotational coupling device 520 is illustrated. Device 520 is substantially similar to device 420 discussed hereinabove. Device 520 differs from device 420 in that device 520 omits the spacer 48 found in the hub assembly 24 of device 420 and instead integrates the rotor hub 44 and spacer 48 of device 20 into a unitary (one-piece) rotor hub 544. As a result, portion 486 and fixed end 488 of shield 440 are disposed axially between bearing 26 and rotor hub 544 and, in particular, between opposed radially extending surfaces of the inner race of bearing 26 and rotor hub 544.

Figure 10:
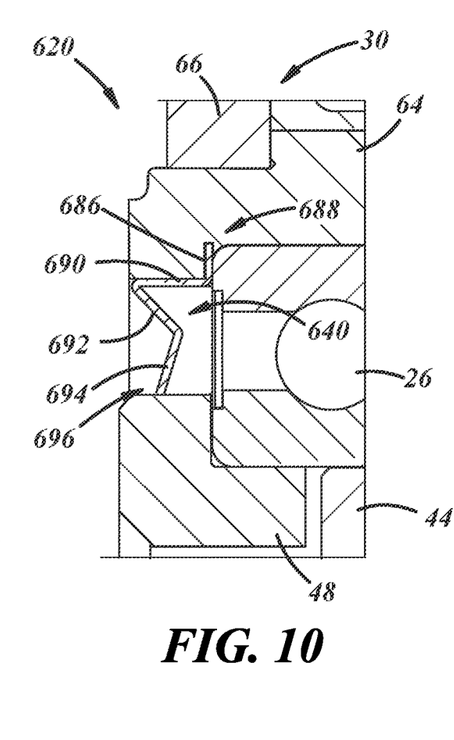

Referring now to FIG. 10, another alternative embodiment of a rotational coupling device 620 is illustrated. Device 620 is substantially similar to device 420 discussed hereinabove. Device 620 differs from device 420 in that device 620 includes a shield 640 whose orientation differs from the orientation of shield 440 in device 420. Shield 640 is again provided to inhibit contaminants such as fluids or dust from damaging bearing 26. In particular, shield 640 inhibits the passage of contaminants from the external environment through air gap 54 to bearing 26. Shield 640 may be made from a variety of materials. In certain embodiments, shield 640 is made from materials having a relatively high magnetic permeability such as ferromagnetic materials such that shield 640 transfers flux from spacer 48 to member 64 of housing 60 of electromagnet 30. Shield 640 is annular in shape and is disposed about, and may be centered about, axis 42.

Shield 640 includes an a radially outermost portion 686 that extends in a generally radial direction and defines a fixed end 688 of the shield 640. Portion 686 and fixed end 688 are disposed axially between bearing 26 and electromagnet 30 and, in particular, between opposed radially extending surfaces of the outer race of bearing 26 and member 64 of housing 60 of electromagnet 30. During assembly of device 620 and prior to providing device 620 to an end user, shield 640 is positioned to align portion 686 of shield 640 with the outer race of bearing 26 and electromagnet 30 is then moved along axis 42 and coupled to rotor hub 44 thereby securing portion 686 of shield 640 between the outer race of bearing 26 and electromagnet 30. In this manner, movement of fixed end 688 of shield 640 is inhibited. Shield 640 further includes a portion 690 that extends in a generally axial direction and has an inboard axial end extending from a radially inner end of portion 686. Portion 690 is disposed within and extends through at least a portion of the axial width of air gap 54 and may extend through the entire axial width of air gap 54. Shield 640 further includes a portion 692 that extends from portion 690 in a radially inward direction and an axially inboard direction. A radially outer end of portion 692 extends from an axially outboard end of portion 690 opposite the axially inboard end of portion 690 joined to portion 686. The radially outer end of portion 692 intersects the axially outboard end of portion 690 at an acute angle. Shield 640 further includes a radially innermost portion 694 that extends from portion 692 in a radially inward direction and in an axially outboard direction. A radially outer end of portion 694 extends from a radially inner end of portion 692 opposite the radially outer end of portion 692 joined to portion 690. The radially outer end of portion 694 intersects the radially inner end of portion 692 at an acute angle. Portion 494 defines a free end 496 of shield 440 that is configured for engagement with electromagnet 30. Portions 692,694 are at least partially disposed within air gap 54 and portions 692, 694 together extend across the entire radial length of air gap 54. Portion 694 defines a free end 696 of shield 640 that is configured for engagement with spacer 48. In particular, a radially inner end of portion 694 is configured for engagement with a radially outer surface of spacer 48. Because of the configuration of shield 640, shield 640 is configured to deform from a normal or unstressed state prior to assembly to a deformed or stressed state after assembly in which the free end 696 applies a spring force against the surface of spacer 48. In some embodiments shield 640 may again be made from materials, such as ferromagnetic materials, that allow magnetic flux to travel from rotor hub 44 to electromagnet 30 (through spacer 48 and shield 640) when electromagnet 30 is energized. The flow of magnetic flux may further result in improved sealing for bearing 26. In particular, when electromagnet 30 is energized, the magnetic flux traveling between spacer 48 and shield 640 creates a magnetic attraction between spacer 48 and shield 640 supplementing the spring force and creating a stronger engagement between portion 694 and free end 696 with spacer 48 further reducing the likelihood that contaminants will reach air gap 54 and bearing 26.

Figure 11:
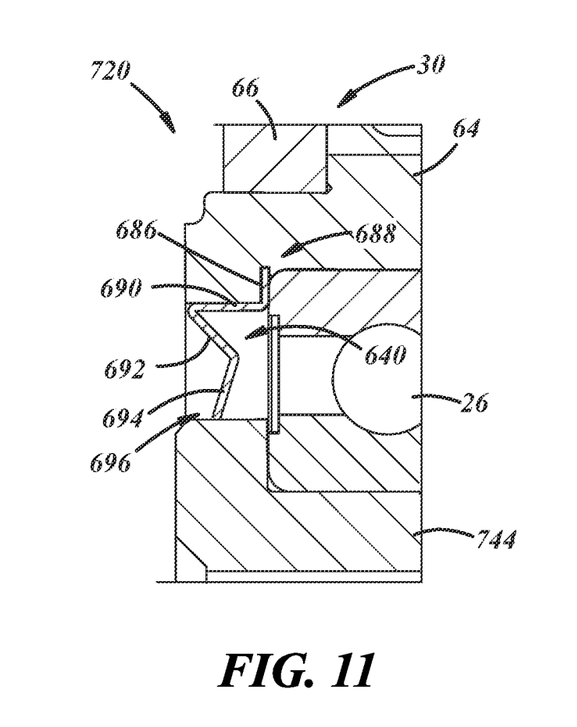

Referring now to FIG. 11, another alternative embodiment of a rotational coupling device 720 is illustrated. Device 720 is substantially similar to device 620 discussed hereinabove. Device 720 differs from device 620 in that device 720 omits the spacer 48 found in the hub assembly 24 of device 620 and instead integrates the rotor hub and spacer of device 620 into a unitary (one-piece) rotor hub 744. As a result, portion 694 and free end 696 of shield 620 are configured to engage a surface of rotor hub 744.

Figure 12:
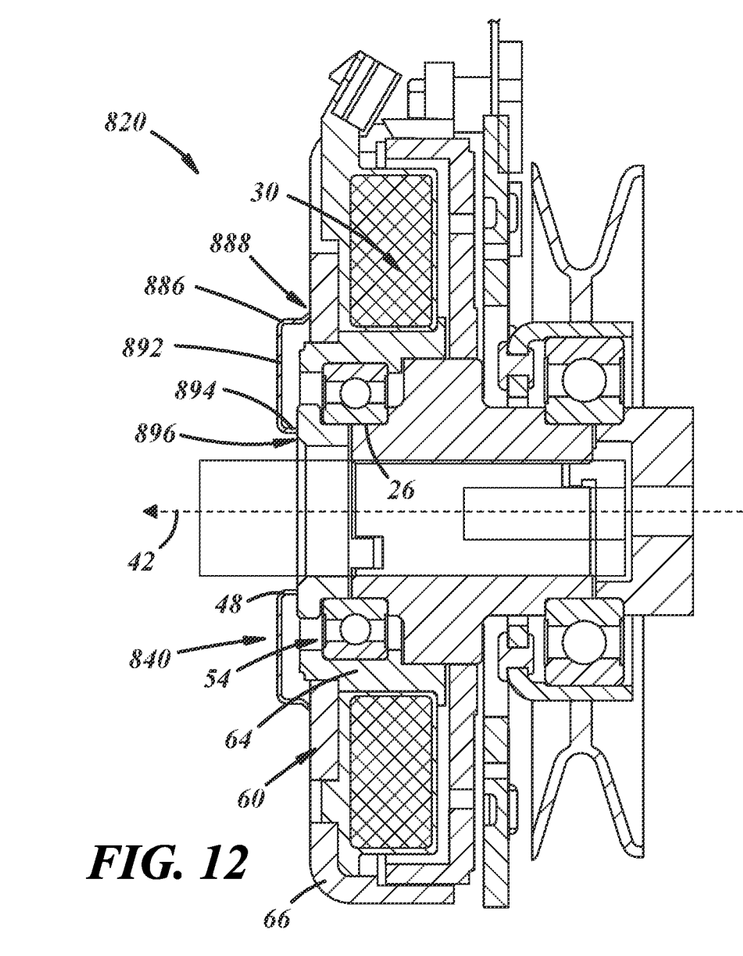
FIG. 12 is a cross-sectional view of another alternative embodiment of a rotational coupling device.

Referring now to FIG. 12, another alternative embodiment of a rotational coupling device 820 is illustrated. Device 820 is substantially similar to device 20 described hereinabove. Device 820 differs from device 20 in that device 820 includes a different embodiment of a bearing shield 840. Shield 840 is provided to inhibit contaminants such as fluids or dust from damaging bearing 26. In particular, shield 840 inhibits the passage of contaminants from the external environment through air gap 54 to bearing 26. Shield 840 may be made from a variety of materials. In certain embodiments, shield 840 is made from materials having a relatively high magnetic permeability such as ferromagnetic materials such that shield 840 transfers flux from spacer 48 to one of members 64, 66 of housing 60 of electromagnet 30. Shield 840 is annular in shape and is disposed about, and may be centered about, axis 42.

Shield 840 includes a radially outermost portion 886 that extends generally axially and defines a fixed end 888 that is coupled to electromagnet 30. During assembly of device 820 and prior to providing device 820 to an end user, fixed end 888 may be affixed to electromagnet 30 in a variety of ways including by mechanical deformation (e.g., staking), adhesives, brazing, etc. In the illustrated embodiment, fixed end 888 is coupled to member 66 of housing 60 of electromagnet 30. It should be understood, however, that fixed end 888 may be coupled to any surface of electromagnet 30 including a surface within air gap 54. Shield 840 further includes a portion 892 that extends from portion 886 in a generally radial direction. A radially outermost end of portion 892 is coupled to an axially outboard end of portion 886. Portion 892 is axially aligned with and extends across the entire radial length of air gap 54. Shield 840 further includes a portion 894 that extends from portion 892 in a generally axial direction. Portion 894 is therefore radially spaced from portion 886. An axially outboard end of portion 894 is coupled to a radially inner end of portion 892. An axially inboard end of portion 894 defines a free end 896 of shield 840 that is configured to engage spacer 48 and, in the illustrated embodiment, a radially extending surface of spacer 48. As noted above, in some embodiments shield 840 may be made from materials, such as ferromagnetic materials, that allow magnetic flux to travel from rotor hub 44 to electromagnet 30 (through spacer 48 and shield 840) when electromagnet 30 is energized. The flow of magnetic flux may further result in deformation of shield 840 and improved sealing for bearing 26. In particular, shield 840 has a normal or unstressed state when electromagnet 30 is not energized. In this state, portion 894 and free end 896 of shield 840 may be axially spaced from spacer 48 (particularly as the surfaces of shield 840 and spacer 48 become worn after use). When electromagnet 30 is energized, shield 840 assumes a deformed or stressed state. In this state, the magnetic flux traveling between spacer 48 and shield 840 creates a magnetic attraction between spacer 48 and shield 840 urging portion 894 and free end 896 of shield 840 towards spacer 48 and, preferably, into contact with spacer 48 thereby reducing or eliminating any gap between shield 840 and spacer 48 further reducing the likelihood that contaminants will reach air gap 54 and bearing 26. Although the free end 896 of shield 840 engages spacer 48 in the illustrated embodiment, it should again be understood that, in an alternative embodiment, a separate spacer 48 may be omitted and integrated into rotor hub 44 as a unitary (one-piece) body such that the free end 896 of shield 840 engages a surface of rotor hub 44.

Figure 13:
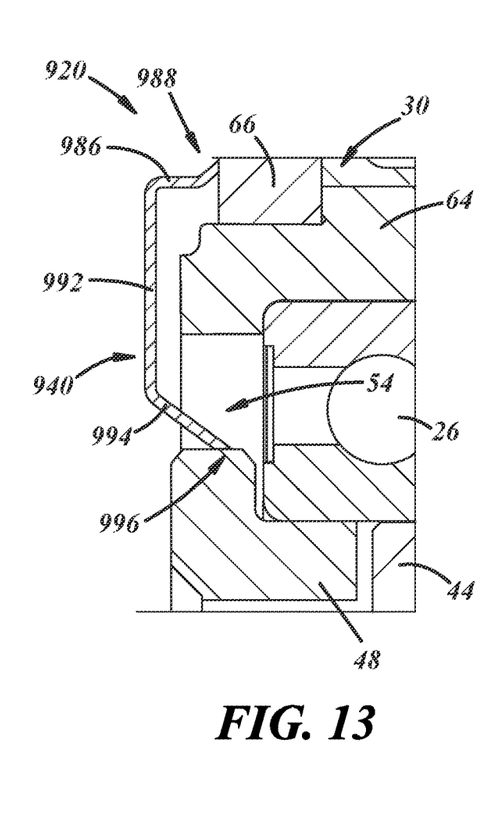
FIG. 13-15 are partial cross-sectional views of additional alternate embodiments of a rotational coupling device.

Referring now to FIG. 13, another alternative embodiment of a rotational coupling device 920 is illustrated. Device 920 is substantially similar to device 820 discussed hereinabove. Device 920 differs from device 820 in that device 920 includes a different embodiment of a bearing shield 940. Shield 940 is provided to inhibit contaminants such as fluids or dust from damaging bearing 26. In particular, shield 940 inhibits the passage of contaminants from the external environment through air gap 54 to bearing 26. Shield 940 may be made from a variety of materials. In certain embodiments, shield 940 is made from materials having a relatively high magnetic permeability such as ferromagnetic materials such that shield 940 transfers flux from spacer 48 to one of members 64, 66 of housing 60 of electromagnet 30. Shield 940 is annular in shape and is disposed about, and may be centered about, axis 42.

Shield 940 includes a radially outermost portion 986 that extends generally axially and defines a fixed end 988 that is coupled to electromagnet 30. During assembly of device 920 and prior to providing device 920 to an end user, fixed end 988 may be affixed to electromagnet 30 in a variety of ways including by mechanical deformation (e.g., staking), adhesives, brazing, etc. In the illustrated embodiment, fixed end 988 is coupled to member 66 of housing 60 of electromagnet 30. It should be understood, however, that fixed end 988 may be coupled to any surface of electromagnet 30 including a surface within air gap 54. Shield 940 further includes a portion 992 that extends from portion 986 in a generally radial direction. A radially outermost end of portion 992 is coupled to an axially outboard end of portion 986. Shield 940 further includes a portion 994 that extends radially inwardly and axially inboard from portion 992. Portion 994 is therefore radially spaced from portion 986. A radially outer and axially outboard end of portion 994 is coupled to a radially inner end of portion 992. A radially inner and axially inboard end of portion 994 defines a free end 996 of shield 940 that is configured to engage spacer 48 and, in the illustrated embodiment, an axially extending surface of spacer 48 within air gap 54. Portion 994 is partially disposed within air gap 54. Portions 992 and/or 994 are axially aligned with and extends across the entire radial length of air gap 54. Because of the configuration of shield 940, shield 940 is configured to deform from a normal or unstressed state prior to assembly to a deformed or stressed state after assembly (and, in particular, as spacer 48 is advanced in an axially inboard direction along axis 42) in which the free end 996 applies a spring force against the surface of spacer 48. In some embodiments shield 940 may again be made from materials, such as ferromagnetic materials, that allow magnetic flux to travel from rotor hub 44 to electromagnet 30 (through spacer 48 and shield 940) when electromagnet 30 is energized. The flow of magnetic flux may further result in improved sealing for bearing 26. In particular, when electromagnet 30 is energized, the magnetic flux traveling between spacer 48 and shield 940 creates a magnetic attraction between spacer 48 and shield 940 supplementing the spring force and creating a stronger engagement between portion 994 and free end 996 with spacer 48 further reducing the likelihood that contaminants will reach air gap 54 and bearing 26. Although the free end 996 of shield 940 engages spacer 48 in the illustrated embodiment, it should again be understood that, in an alternative embodiment, a separate spacer 48 may be omitted and integrated into rotor hub 44 as a unitary (one-piece) body such that the free end 996 of shield 940 engages a surface of rotor hub 44.

Figure 14:
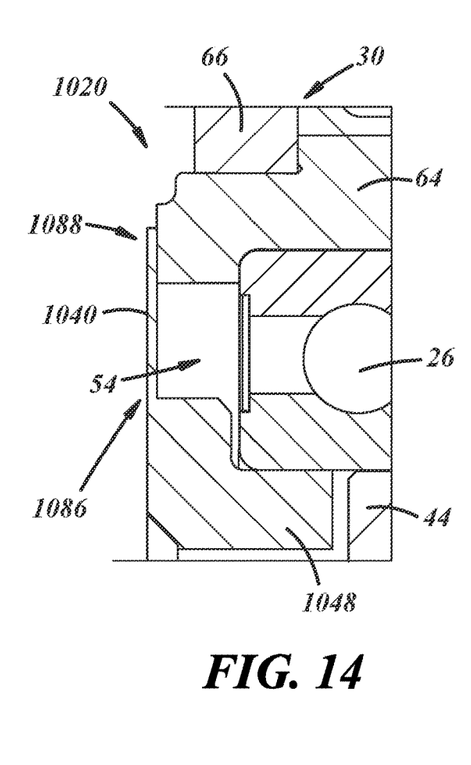

Referring now to FIG. 14, another alternative embodiment of a rotational coupling device 1020 is illustrated. Device 1020 is substantially similar to device 20 discussed hereinabove. Device 1020 differs from device 20 in that device 1020 omits a separate bearing shield 40 and instead integrates a bearing shield 1040 into a spacer 1048 in a unitary (one-piece) body. In particular, shield 1040 is defined by a radially outwardly extending flange formed at an axially outboard end of spacer 1048 and defining a radially inner fixed end 1086 and a radially outer free end 1088. Shield 1040 is provided to inhibit contaminants such as fluids or dust from damaging bearing 26. In particular, shield 1040 inhibits the passage of contaminants from the external environment through air gap 54 to bearing 26. Shield 1040 extends across the entire radial length of air gap 54. Spacer 1048 and shield 1040 may again be made from materials, such as ferromagnetic materials, that allow magnetic flux to travel from rotor hub 44 to electromagnet 30 (through spacer 1048 and shield 1040) when electromagnet 30 is energized. The flow of magnetic flux may further result in improved sealing for bearing 26. In particular, shield 1040 may be sufficiently thin to allow shield 1040 to deform from a normal or unstressed state when electromagnet 30 is not energized to a deformed or stressed state when electromagnet is energized. In the normal or unstressed state, free end 1088 may be spaced from electromagnet 30 (particularly as the surfaces of shield 1040 an electromagnet 30 become worn after use). In the stressed state, magnetic flux traveling through shield 1040 to housing 60 of electromagnet 30 creates a magnetic attraction between shield 1040 and housing 60 urging free end 1088 of shield 1040 towards housing 60 of electromagnet 30 and, preferably, into contact with housing 60 of electromagnet 30 thereby reducing or eliminating any gap between shield 1040 and housing 60 of electromagnet 30 and further reducing the likelihood that contaminants will reach air gap 54 and bearing 26. Although the shield 1040 is formed as a part of spacer 1048 in the illustrated embodiment, it should again be understood that, in an alternative embodiment, a separate spacer 1048 may be omitted and integrated into rotor hub 44 as a unitary (one-piece) body such that the shield 1040 instead forms a part of rotor hub 44.

Figure 15:
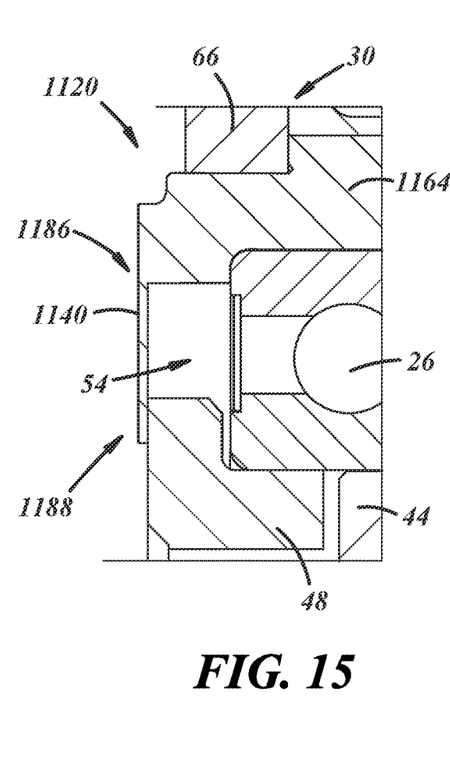

Referring now to FIG. 15, another alternative embodiment of a rotational coupling device 1120 is illustrated. Device 1120 is substantially similar to device 20 discussed hereinabove. Device 1120 differs from device 20 in that device 1120 omits a separate bearing shield 40 and instead integrates a bearing shield 1140 into member 1164 of housing 60 of electromagnet 30 in a unitary (one-piece) body. In particular, shield 1140 is defined by a radially inwardly extending flange formed at an axially outboard end of member 1164 and defining a radially outer fixed end 1186 and a radially inner free end 1188. Shield 1140 is provided to inhibit contaminants such as fluids or dust from damaging bearing 26. In particular, shield 1140 inhibits the passage of contaminants from the external environment through air gap 54 to bearing 26. Shield 1140 extends across the entire radial length of air gap 54. Member 1164 and shield 1140 may again be made from materials, such as ferromagnetic materials, that allow magnetic flux to travel from rotor hub 44 to electromagnet 30 (through spacer 48 and shield 1140) when electromagnet 30 is energized. The flow of magnetic flux may further result in improved sealing for bearing 26. In particular, shield 1140 may be sufficiently thin to allow shield 1140 to deform from a normal or unstressed state when electromagnet 30 is not energized to a deformed or stressed state when electromagnet is energized. In the normal or unstressed state, free end 1188 may be spaced from spacer 48 (particularly as the surfaces of shield 1040 and spacer 48 become worn after use). In the stressed state, magnetic flux traveling through shield 1140 to spacer 48 creates a magnetic attraction between shield 1140 and spacer 48 urging free end 1188 of shield 1140 towards spacer 48 and, preferably, into contact with spacer 48 thereby reducing or eliminating any gap between shield 1140 and spacer 48 and further reducing the likelihood that contaminants will reach air gap 54 and bearing 26. Although the free end 1188 of shield 1140 contacts spacer 48 in the illustrated embodiment, it should again be understood that, in an alternative embodiment, a separate spacer 48 may be omitted and integrated into rotor hub 44 as a unitary (one-piece) body such that the fee end 1188 of shield 1140 instead contacts rotor hub 44.

A rotational coupling device 20, 120, 220, 320, 420, 520, 620, 720, 820, 920, 1020, or 1120 in accordance with the present teachings is advantageous relative to conventional coupling devices. The coupling device 20, 120, 220, 320, 420, 520, 620, 720, 820, 920, 1020, or 1120 includes a shield 40, 240, 440, 640, 840, 940, 1040 or 1140 that inhibits contaminants such as fluids and particulates from reaching a bearing 26 of the device 20, 120, 220, 320, 420, 520, 620, 720, 820, 920, 1020, or 1120. A fixed end 86, 286, 486, 686, 886, 986, 1086 or 1186 of the shield 40, 240, 440, 640, 840, 940, 1040 or 1140 is coupled to the hub assembly 24 or electromagnet 30 and may therefore be included with the device 20, 120, 220, 320, 420, 520, 620, 720, 820, 920, 1020, or 1120 as a pre-assembled unit thereby eliminating an inconvenience for the end user of the device and eliminating the possibility that the end user will forget to install or improperly install the shield 40, 240, 440, 640, 840, 940, 1040 or 1140. Further, because the shield 40, 240, 440, 640, 840, 940, 1040 or 1140 is not directly attached to the bearing race, potential damage and/or misalignment of the bearing 26 during assembly is reduced. In certain embodiments, the shield 40, 240, 440, 640, 840, 940, 1040 or 1140 is also configured to provide an additional flux transfer path for the electromagnetic circuit in the coupling device 20, 120, 220, 320, 420, 520, 620, 720, 820, 920, 1020, or 1120 to improve flux transfer within the device 20, 120, 220, 320, 420, 520, 620, 720, 820, 920, 1020, or 1120. In certain embodiments, the shield 40, 240, 440, 640, 840, 940, 1040 or 1140 may also deform in the presence of magnetic flux and/or as the result of a spring force to reduce the size of an opening leading to the bearing 26 and improve sealing of the bearing 26.

While the invention has been shown and described with reference to one or more particular embodiments thereof, it will be understood by those of skill in the art that various changes and modifications can be made without departing from the spirit and scope of the invention.

What is claimed is:

1. A rotational coupling device, comprising:
a hub assembly configured for rotation about a rotational axis, the hub assembly including a rotor hub disposed about the rotational axis and configured to receive a shaft and a rotor disc extending radially outwardly from the rotor hub;
an armature disposed on a first axial side of the rotor disc;
an electromagnet disposed on a second axial side of the rotor disc opposite the armature and fixed against rotation;
a bearing disposed between the rotor hub and the electromagnet, the hub assembly and the electromagnet separated by an air gap on an outboard side of the bearing, and,
a shield partially disposed within the air gap and extending across the entire radial length of the air gap, the shield having a fixed end engaging one of the hub assembly and the electromagnet and a free end opposite the fixed end, the free end configured for engagement with the other one of the hub assembly and the electromagnet.

2. The rotational coupling device of claim 1 wherein the fixed end of the shield is disposed between the bearing and the one of the hub assembly and the electromagnet.

3. The rotational coupling device of claim 2 wherein the fixed end of the shield is disposed between the bearing and the rotor hub of the hub assembly.

4. The rotational coupling device of claim 2 wherein the hub assembly includes a spacer engaging a first axial end of the rotor hub and supporting the bearing and the fixed end of the shield is disposed between the bearing and the rotor hub of the hub assembly.

5. The rotational coupling device of claim 2 wherein the fixed end of the shield is disposed between a radially inner race of the bearing and the hub assembly.

6. The rotational coupling device of claim 5 wherein the fixed end of the shield is disposed between a radially extending surface of the inner race of the bearing and a radially extending surface of the hub assembly.

7. The rotational coupling device of claim 2 wherein the fixed end of the shield is disposed between a radially outer race of the bearing and the electromagnet.

8. The rotational coupling device of claim 7 wherein the fixed end of the shield is disposed between a radially extending surface of the outer race of the bearing and a radially extending surface of the electromagnet.

9. The rotational coupling device of claim 1 wherein the shield extends through the entire axial width of the air gap.

10. The rotational coupling device of claim 1 wherein the free end of the shield is located outside of the air gap and is configured to engage a radially extending surface of the other one of the hub assembly and the electromagnet.

11. The rotational coupling device of claim 1 wherein the free end of the shield is located inside of the air gap and is configured to engage an axially extending surface of the other one of the hub assembly and the electromagnet.

12. The rotational coupling device of claim 11 wherein the free end of the shield applies a spring force against the axially extending surface of the other one of the hub assembly and the electromagnet.

13. The rotational coupling device of claim 1 wherein magnetic flux travels from the hub assembly to the electromagnet through the shield when the electromagnet is energized.

14. The rotational coupling device of claim 1 wherein the shield assumes a first state when the electromagnet is not energized in which the free end of the shield is axially spaced from the other one of the hub assembly and the electromagnet and the shield deforms and assumes a second state when the electromagnet is energized in which the shield contacts the other one of the hub assembly and the electromagnet.

15. The rotational coupling device of claim 1 wherein the shield is made from a ferromagnetic material.

16. A rotational coupling device, comprising:
a hub assembly configured for rotation about a rotational axis, the hub assembly including a rotor hub disposed about the rotational axis and configured to receive a shaft and a rotor disc extending radially outwardly from the rotor hub;
an armature disposed on a first axial side of the rotor disc;
an electromagnet disposed on a second axial side of the rotor disc opposite the armature and fixed against rotation;
a bearing disposed between the rotor hub and the electromagnet, the hub assembly and the electromagnet separated by an air gap on an outboard side of the bearing, and,
a shield extending across the entire radial length of the air gap, the shield having a fixed end affixed to the electromagnet and a free end opposite the fixed end, the free end configured for engagement with the hub assembly.

17. The rotational coupling device of claim 16 wherein the free end of the shield extends into the air gap and is configured to engage an axially extending surface of the hub assembly.

18. The rotational coupling device of claim 17 wherein the free end of the shield applies a spring force against the axially extending surface of the hub assembly.

19. The rotational coupling device of claim 16 wherein magnetic flux travels from the hub assembly to the electromagnet through the shield when the electromagnet is energized.

20. A rotational coupling device, comprising:
a hub assembly configured for rotation about a rotational axis, the hub assembly including a rotor hub disposed about the rotational axis and configured to receive a shaft and a rotor disc extending radially outwardly from the rotor hub;
an armature disposed on a first axial side of the rotor disc;
an electromagnet disposed on a second axial side of the rotor disc opposite the armature and fixed against rotation;
a bearing disposed between the rotor hub and the electromagnet, the hub assembly and the electromagnet separated by an air gap on an outboard side of the bearing
wherein one of a component of the hub assembly and the electromagnet defines a radially extending shield axially aligned with, and extending across the entire radial length of, the air gap, the shield forming a unitary body with the one of the component of the hub assembly and the electromagnet.

* * * * *